July 5, 1927.
J. E. SAPP
1,634,688
ANIMAL TRAP
Filed Feb. 8, 1926
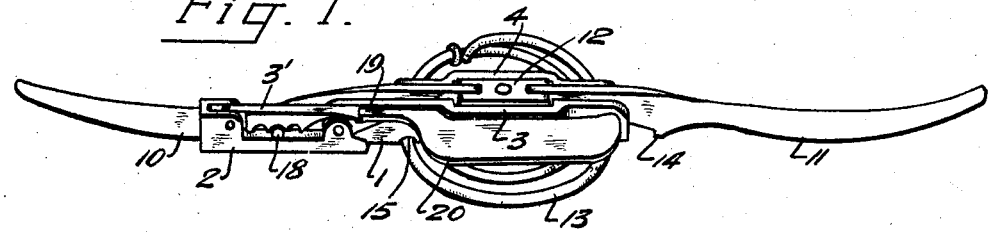
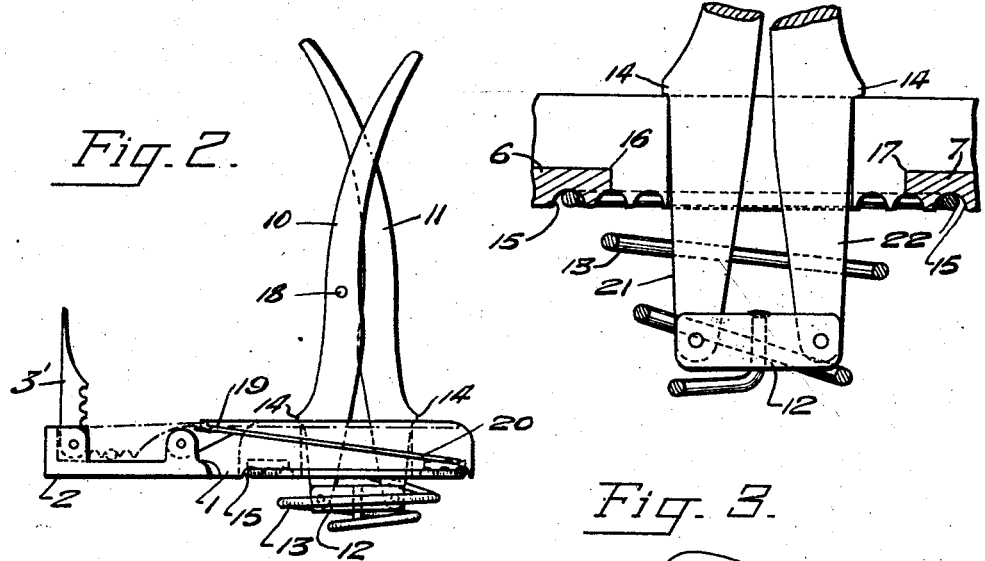
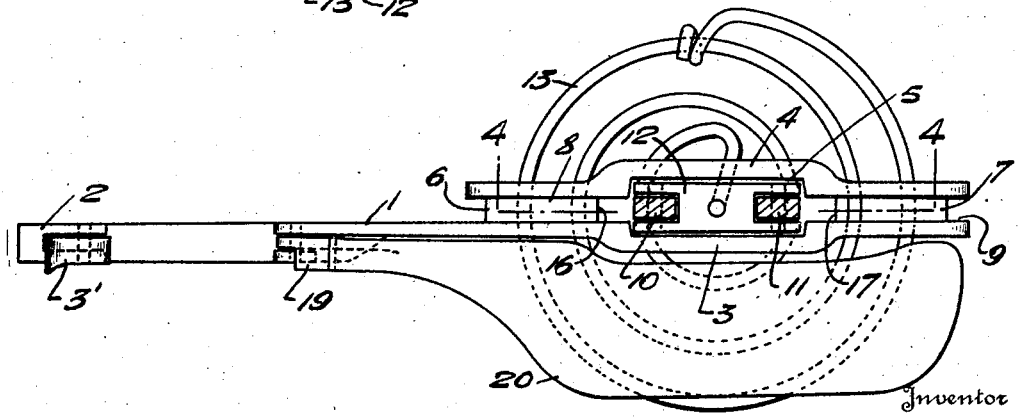
Inventor
James E. Sapp
By
Attorney Patented July 5, 1927.

1,634,688

UNITED STATES PATENT OFFICE.

JAMES E. SAPP, OF BAINBRIDGE, GEORGIA, ASSIGNOR OF ONE-HALF TO ROLAND BOWER, OF BAINBRIDGE, GEORGIA.

ANIMAL TRAP.

Application filed February 8, 1926. Serial No. 86,838.

This invention relates to animal traps and proposes the construction of a device of the class designated in which ease of concealment, convenience and safety in setting, surety of operation, and avoidance of injury to the fur are paramount features.

One of the objects of the invention is to construct a trap having a spring lying flat when set, and preferably seated within recesses in the body of the trap, so that the spring contributes nothing to the height of the trap, the latter being of inconspicuous dimension making it susceptible of easy concealment.

Another object of the invention is to provide a trap, the spring of which may be compressed, through leverage obtained by pressing down one or more of the jaws, the trigger being at the side of the path of movement of the jaws, thereby avoiding the risk of injury through inadvertent release of the trigger when the trap is being set.

A further object of the invention is to construct a trap having the jaws thereof arranged so that the ratio of power to speed in their operation increased toward the closing movement of the jaws, the latter functioning quickly to grab the animal, and the more tightly to hold it after it is caught.

Other objects of the invention will appear as the following description of a preferred embodiment thereof proceeds.

In the drawings—

Figure 1 is a perspective view of my improved animal trap in set position;

Figure 2 is a front elevation of the same showing the parts released;

Figure 3 is a plan view of the trap, partly in section taken in a horizontal plane through the jaws;

Figure 4 is a section taken along the line 4—4 of Fig. 3.

Referring now in detail to the several figures, the numeral 1 represents the base plate which at one end is formed with a slotted lug 2 within which the latch 3' is pivotally mounted and at the other end with a double yoke portion having indented sides 3 and 4, together forming a rectangular passage 5, the lower portions of said sides are joined by webs 6 and 7, being otherwise spaced apart forming deep slots 8 and 9 flanking the passage 5 and communicating therewith. It is quite obvious that the base plate may be made in one or two parts, at the option of the manufacturer.

The jaws 10 and 11 are suitably shaped, as shown, to perform their catching and holding function, and then are pivotally connected at their lower ends to a link 12. Said link is of such size as freely to enter through the passage 5 and the jaws normally repose, when the trap is in released condition, with their lower ends extending through said passage to a distance beneath the base plate. The link 12 is preferably perforated to receive the inturned end of an inverted conical spring 13 the helices of which surround the downwardly projecting ends of said jaws. The spring is securely riveted to the link 12 and the jaws are preferably formed with projections 14 which act as limit stops against the upper face of the base plate to prevent the jaws from being pulled through the passage 5 by the tension of the spring 13.

The lower face of the base plate is formed on each side of the passage 5 with grooves 15 registering with the helices of the spring, and housing the latter when it is compressed into a single plane. The spring is compressed by pushing outwardly and downwardly upon one or both of the jaws 10 or 11, causing them to fulcrum upon the shoulders 16 and 17 formed where the slots 8 and 9 debouch into the passage 5.

As the jaws approach a horizontal position, they draw up the link 12 into the passage 5 and with it the spring 12 until the helices of the latter lie in the grooves 15. At this time the jaws and link will have assumed the position in which they lie substantially in a straight line housed within the passage 5 and in the slots 8 and 9. It will thus be seen that neither the spring nor jaws, when the trap is set add to the height of the same, the trap then being of minimum altitude and easy to conceal.

The setting means comprises the latch 3', previously mentioned, having a corrugated lower side adapted to engage a pin 18 carried by one of the jaws, said latch being detained by a trigger 19, said trigger including a foot plate 20. When the trap is set, pressure of the spring 13 communicated through the jaw 10 to the pin 18 and thence to the latch 3', holds the latter and the trigger 19 together. When an animal steps upon the foot plate he releases the trigger, the latch flying up under the urge of the spring pressure permitting the jaws to snap together.

On account of the relative location of the foot plate to the plane of movement of the jaws, the animal is caught, not by the leg as is usual but about the neck or body, ensuring the permanence of his capture and avoiding injury to the fur.

The positioning of the latch and the trigger mechanism to one side of the jaws enables one to set the trap in safety, without the risk of the hands being caught by the jaws should the trigger be inadvertently released.

Since the sides 21 and 22 of the lower portions of the jaws, which fulcrum against the upper edges of the base plate at the passage 5, form the sides of a wedge of progressive acuteness as the jaws move to closed position, it is apparent that the ratio of power to speed increases from an initial quick catching movement of the jaws to a final slower but more powerful holding grip.

Although I have described what I believe to be a practical and efficient embodiment of my invention, it is to be understood that I am not limited in the exercise of the invention to precise construction shown being restricted only by the limitations expressly defined in the appended claims.

Having described my invention and set forth its merits, what I claim is:—

1. An animal trap including a base plate having a passage extending therethrough, jaws lying normally on one side of said base plate, a spring on the opposite side of said base plate for closing said jaws, the latter being projectable through said passage and connected to said spring.

2. An animal trap including a base plate having a passage extending therethrough, jaws lying normally on one side of said base plate, a coil spring on the opposite side of said base plate for closing said jaws, the latter being projectable through said passage and connected to said spring said base plate being formed to receive said spring when the latter is fully compressed, within the space between parallel planes embracing the top and bottom of said base plate.

3. An animal trap including a base plate having a passage extending therethrough, jaws lying normally on one side of said base plate, a link pivotally connecting said jaws, said link being of such dimensions as freely to pass, with the adjacent ends of said jaws, through said passage, and a coil spring on the opposite side of said base plate connected to said link.

4. An animal trap including a base plate having a passage extending therethrough, jaws lying normally on one side of said base plate, a link pivotally connecting said jaws, said link being of such dimensions as freely to pass, with the adjacent ends of said jaws, through said passage, and a coil spring on the opposite side of said base plate connected to said jaws, said spring and jaws lying substantially flat when the trap is set.

5. An animal trap including a base plate having a passage extending therethrough and lateral open topped slots, communicating with said passage, jaws lying normally on one side of said base plate, a link, pivotally connecting said jaws, said link being of such dimensions as freely to pass, with the adjacent ends of said jaws, through said passage, a spring on the opposite side of said base plate connected to said jaws, said jaws lying flat in said slots when the trap is set and fulcruming upon the edges of the bottoms of said slots adjacent said passage when the link is drawn through said passage by tension of said spring.

In testimony whereof I affix my signature.

JAMES E. SAPP